United States Patent
Redekop

[11] Patent Number: 6,125,944
[45] Date of Patent: Oct. 3, 2000

[54] TELESCOPING FIELD MARKER

[76] Inventor: John Redekop, Box 136, Plum Coulee, MB, Canada, R0G 1R0

[21] Appl. No.: 08/998,733

[22] Filed: Dec. 29, 1997

[51] Int. Cl.[7] ............................. A01B 69/02; A01B 73/02
[52] U.S. Cl. .............................. 172/131; 33/1 H; 33/264; 33/624
[58] Field of Search .......................... 33/1 H, 18.1, 41.1, 33/264, 275 R, 286, 521, 624; 172/126, 128, 131

[56] References Cited

U.S. PATENT DOCUMENTS

| | | | |
|---|---|---|---|
| 1,402,880 | 1/1922 | Merriman | 33/264 |
| 1,541,456 | 6/1925 | Wilson | 33/264 |
| 2,580,954 | 1/1952 | Przybylski | 33/264 |
| 2,714,255 | 8/1955 | Glazer | 33/286 |
| 3,713,746 | 1/1973 | Luthy | 33/286 |
| 3,755,905 | 9/1973 | Blubaugh et al. | 33/286 |
| 4,063,597 | 12/1977 | Day | 172/126 |
| 4,280,281 | 7/1981 | Gerber | 33/264 |
| 4,379,491 | 4/1983 | Riewerts et al. | 172/328 |
| 4,467,872 | 8/1984 | Hodapp | 172/126 |
| 4,511,005 | 4/1985 | Brown | 33/264 |
| 4,526,236 | 7/1985 | Jacobsen | 172/128 |
| 4,635,847 | 1/1987 | Jackson | 239/1 |
| 4,986,367 | 1/1991 | Kinzenbaw | 172/126 |
| 5,027,525 | 7/1991 | Haukaas | 33/264 |
| 5,379,847 | 1/1995 | Snyder | 172/128 |
| 5,408,756 | 4/1995 | Wahls | 33/624 |
| 5,425,427 | 6/1995 | Haugen | 172/126 |
| 5,484,025 | 1/1996 | Landphair et al. | 172/311 |
| 5,785,128 | 7/1998 | Redekop | 172/126 |

Primary Examiner—Diego Gutierrez
Assistant Examiner—Maria Fernandez
Attorney, Agent, or Firm—Michael S. Neustel

[57] ABSTRACT

A telescoping field marker which is retractable into a compact storage position. The inventive device includes a bracket structure attachable to an implement frame, an inner arm having a lumen pivotally attached to the bracket structure, a hydraulic cylinder attached between said bracket structure and said inner arm, a hydraulic motor within the inner arm adjacent the bracket structure, an outer arm slidably positioned within the lumen of the inner arm, and a threaded shaft connected to the hydraulic motor and threadably connected to a proximal end of the outer arm for extending and retracting the outer arm with respect to the inner arm. A marking disc is attached to a distal end of the outer arm for marking a ground surface. The outer arm is free to move upwardly and downwardly when fully extended thereby compensating for uneven terrain. The hydraulic cylinder and the hydraulic motor are preferably fluidly connected in series so as to operate simultaneously.

19 Claims, 6 Drawing Sheets

TELESCOPING FIELD MARKER

BACKGROUND OF THE INVENTION

1. Field of the Invention

The present invention relates generally to folding field markers and more specifically it relates to a telescoping field marker which is capable of retracting into a compact storage position within a relatively short period of time. Today's implements are becoming increasingly larger and complex. Because of the modern implement's large size, they must be folded into various configurations to allow mobilization of the implement between fields. These various configurations do not allow much space for a conventional field marker. Hence, there is a need for a field marker which is substantially smaller in size when in the storage position.

2. Description of the Prior Art

There are numerous folding field markers. For example, U.S. Pat. Nos. 4,063,597; 5,408,756; 5,425,427; Canadian Patent 1,202,529 and Canadian Patent 1,300,433 are all illustrative of such prior art. All of these inventions utilize four-bar linkages or cable mechanisms to fold an outer arm relative to an inner arm which are overly complex for practical utilization. Further, the prior art all utilize an outer arm pivoting in relation to an inner arm which prevents the utilization of the inner space within the inner arm for providing a compact field marker.

While these devices may be suitable for the particular purpose to which they address, they are not as suitable for retracting into a compact storage position which does not interfere with the implement's operation. The prior art requires an outer arm to pivot about an inner arm. When the outer arm is in the process of being pivoted, the outer arm can potentially interfere with the operation of the implement. Further, when the outer arm is being pivoted, the outer arm is susceptible to increased wear and potentially breakage because of the stresses caused by the moving implement. Also, the outer arm must rest upon or adjacent to the inner arm thereby displacing valuably needed space on the implement.

In these respects, the telescoping field marker according to the present invention substantially departs from the conventional concepts and designs of the prior art, and in so doing provides an apparatus primarily developed for the purpose of telescoping an outer arm from within an inner arm thereby providing a compact field marker which can be utilized on modem implements.

SUMMARY OF THE INVENTION

A primary object of the present invention is to provide a telescoping field marker that will overcome the shortcomings of the prior art devices.

Another object is to provide a telescoping field marker that is retractable into a compact storage position.

An additional object is to provide a telescoping field marker that efficiently utilizes the lumen of the inner arm by storing an extendible outer arm within thereof A further object is to provide a telescoping field marker that is less prone to wear and breakage.

Another object is to provide a telescoping field marker that can be utilized on most modern implements.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Turning now descriptively to the drawings, in which similar reference characters denote similar elements throughout the several view, FIGS. 1 through 6 illustrate a telescoping field marker 10, which comprises a mounting bracket 20 attachable to an implement frame 12, an inner arm 40 having a lumen pivotally attached to the mounting bracket 20, a hydraulic cylinder 28 attached between the mounting bracket 20 and the inner arm 40, a hydraulic motor 70 within the inner arm 40 adjacent the mounting bracket 20, an outer arm 50 slidably positioned within the lumen of the inner arm 40, and a threaded shaft 75 connected to the hydraulic motor 70 and threadably connected to a proximal end of the outer arm 50 for extending and retracting the outer arm 50 with respect to the inner arm 40. A marking disc 52 is attached to a distal end of the outer arm 50 for marking a ground surface, though any other well known marking device may be utilized.

Figure 1:
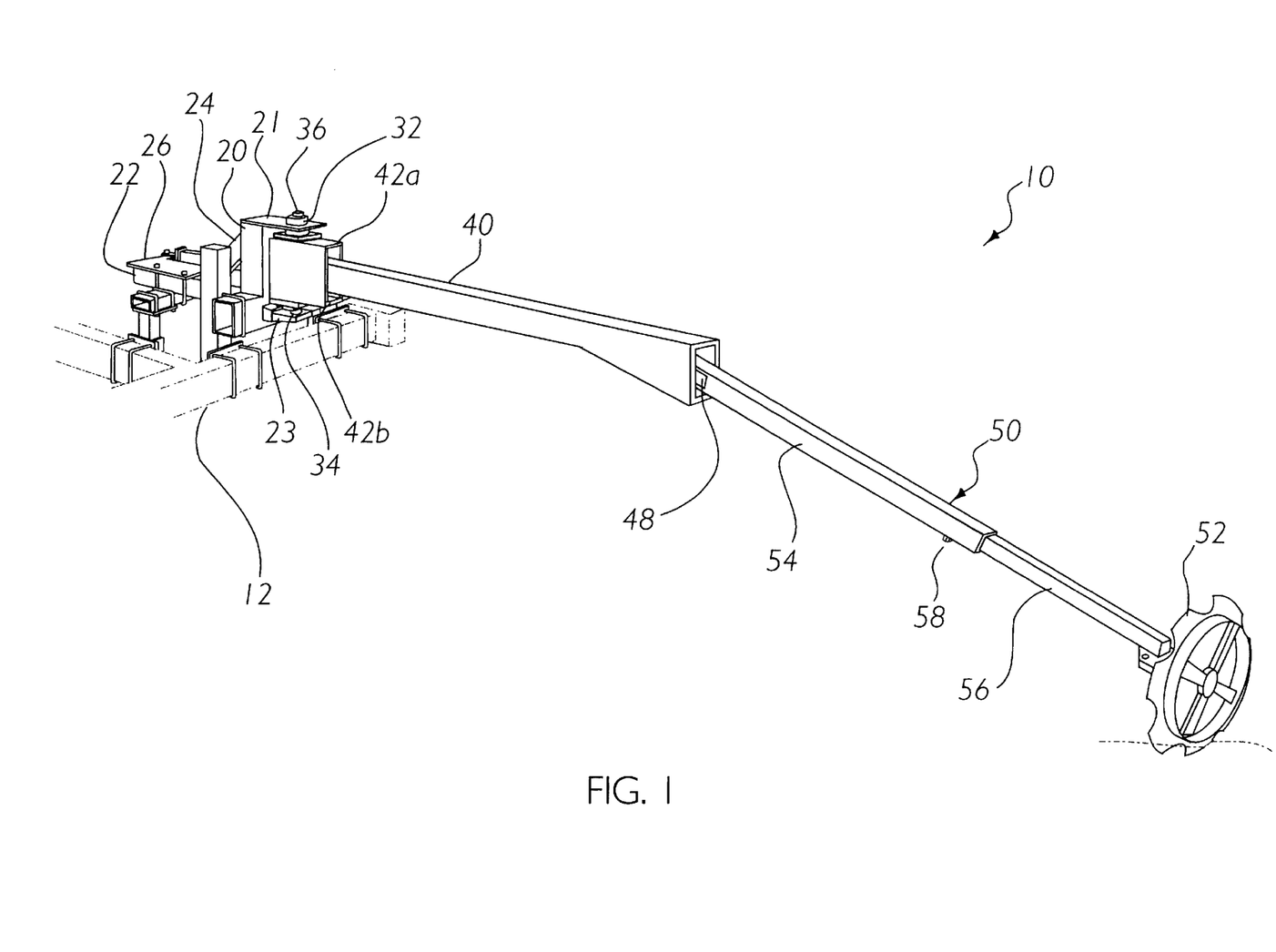
FIG. 1 is an upper perspective view of the present invention.
Figure 2:
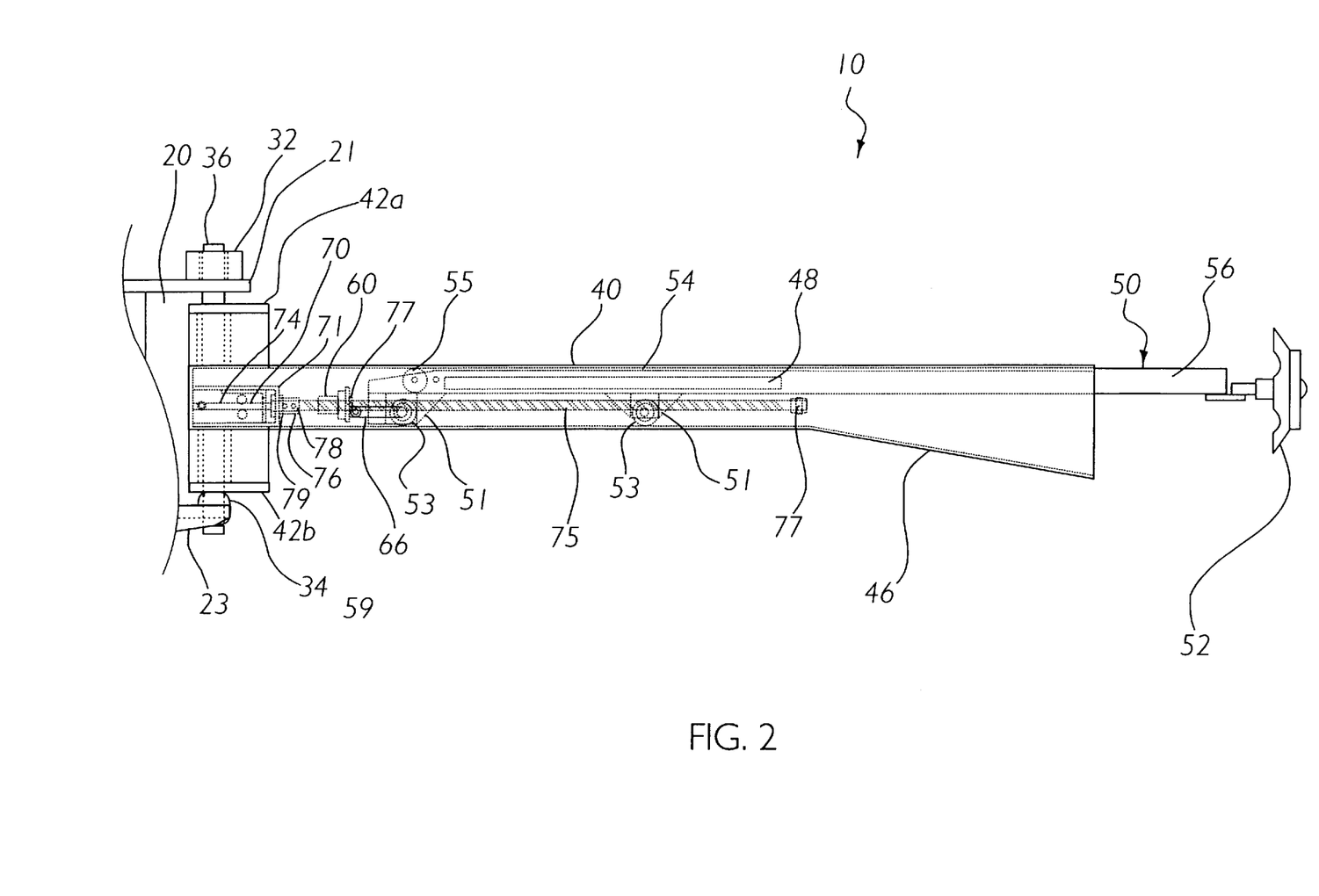
FIG. 2 is a front view of the present invention.
Figure 3:
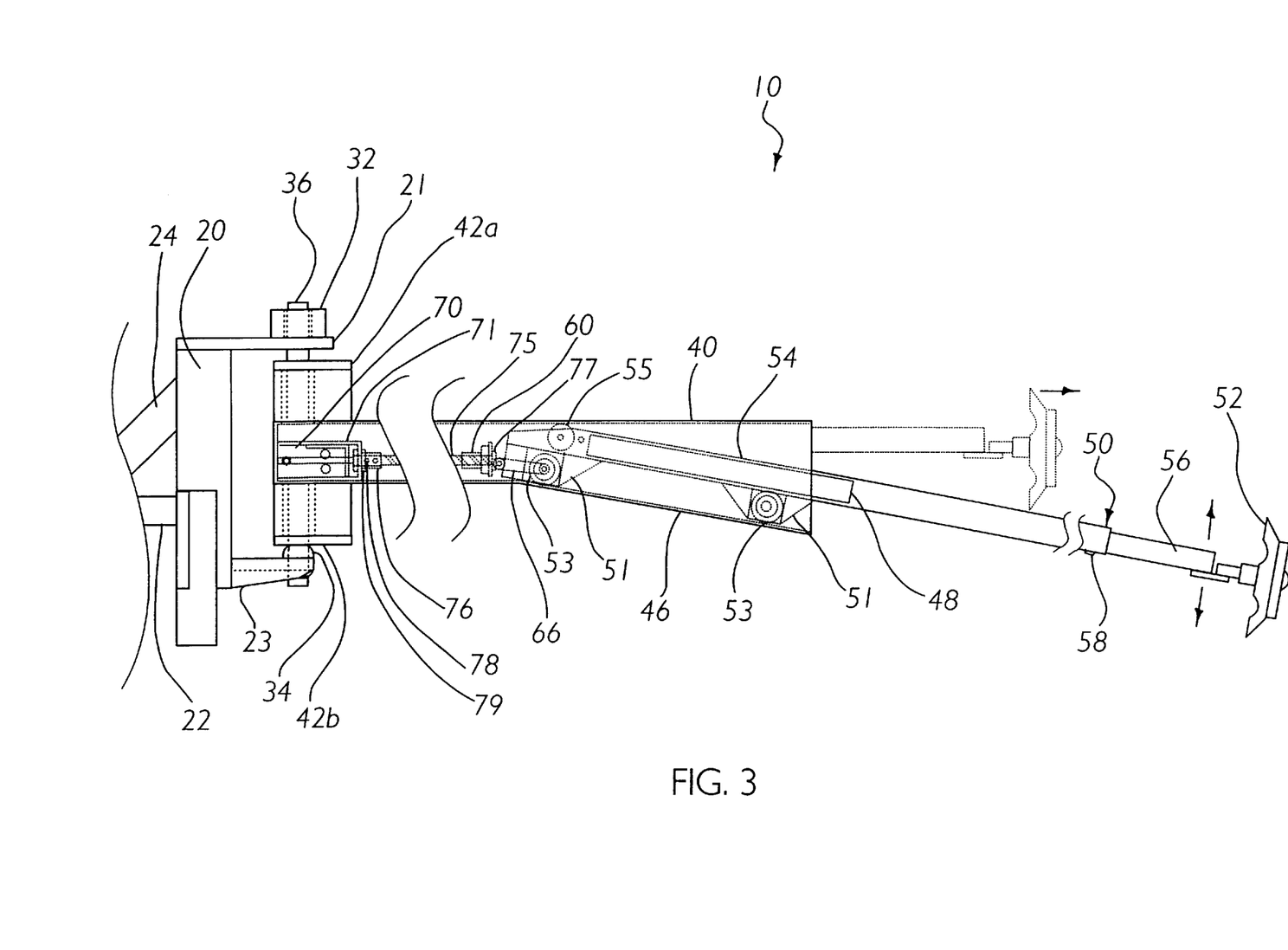
FIG. 3 is a front view of the present invention being fully extended.
Figure 4:
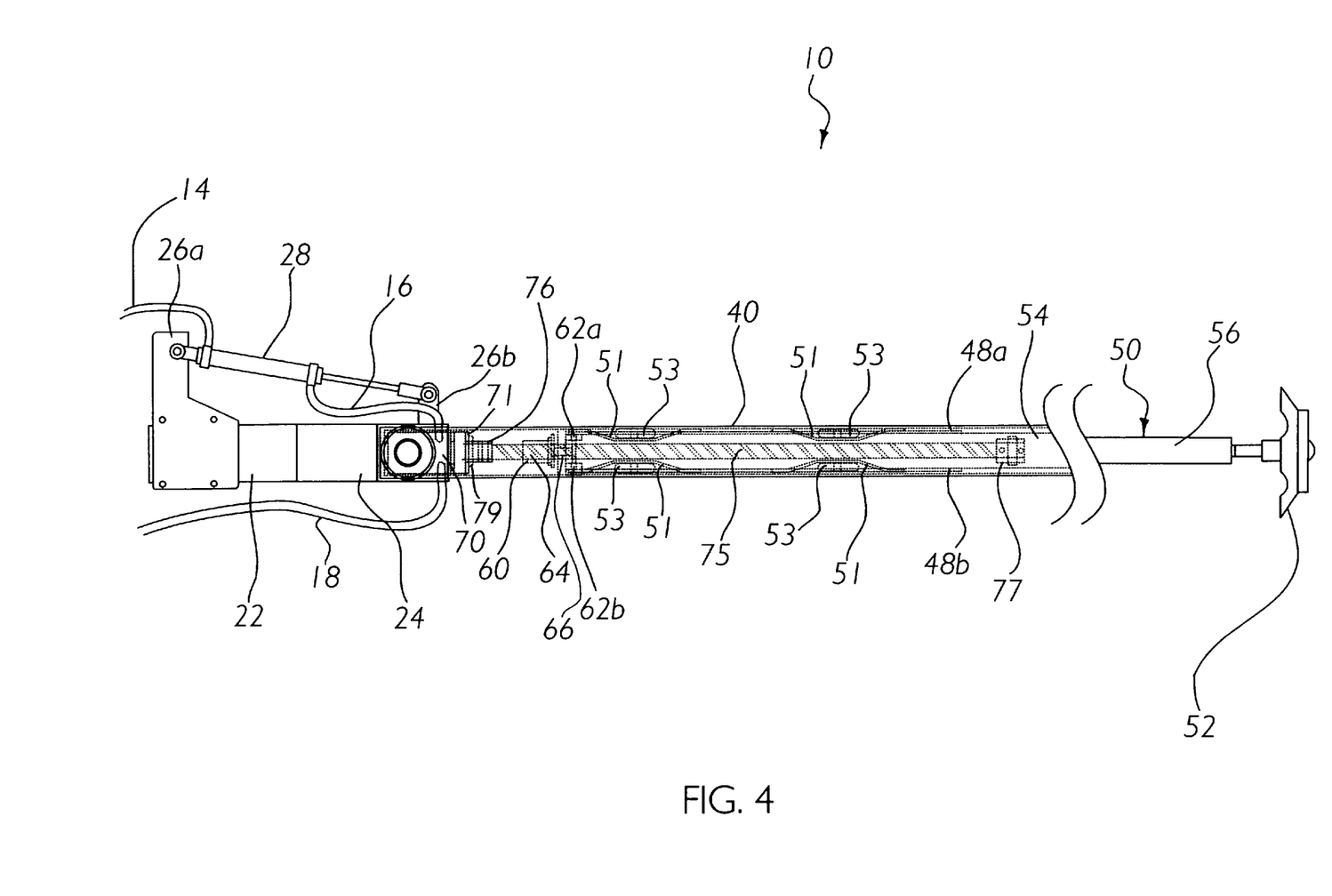
FIG. 4 is a top view of the present invention.

As shown in FIGS. 1 through 6, the mounting bracket 20 is attachable to the implement frame 12. The mounting bracket 20 comprises an upper arm 21, a lower arm 23, an extended member 22, a brace 24 and a side member 26. The hydraulic cylinder 28 is attached to the side member 26 as best shown in FIG. 4 of the drawings. The distal end of the hydraulic cylinder 28 engages the inner arm 40, whereby the hydraulic cylinder 28 extends or retracts the distal end of the inner arm 40 in relation to the implement frame 12. The inner arm 40 is preferably parallel to the implement frame 12 when fully retracted. The inner arm 40 is substantially orthogonal to the implement frame 12 when fully extended as shown in FIG. 1 of the drawings.

Figure 5:
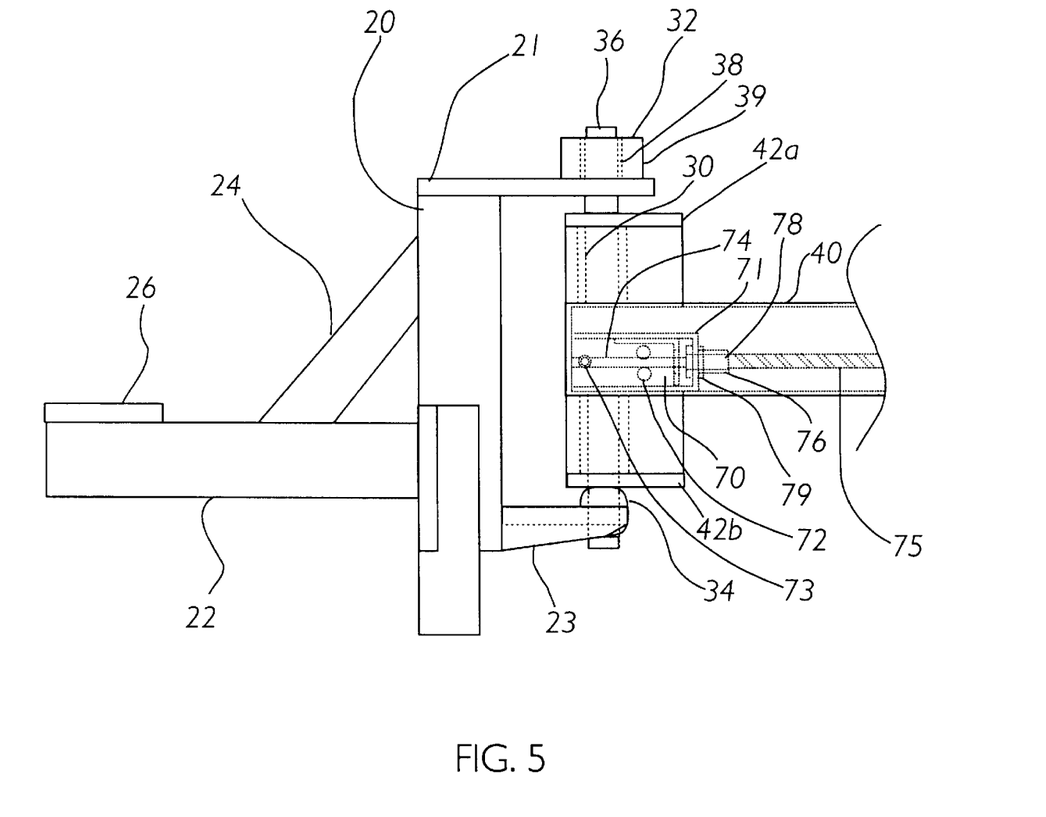
FIG. 5 is a magnified front view of the present invention disclosing the hydraulic motor portion.

As shown in FIG. 5 of the drawings, a pair of outer members 42a–b surround the inner arm 40 between the upper arm 21 and the lower arm 23. A rigid bushing 30 is secured within the inner arm 40 and the pair of outer members 42a–b as shown in FIG. 5 of the drawings.

As shown in FIG. 5 of the drawings, the lower arm 23 includes a ball and socket 34 at the distal end. An outer bushing 39 is attached to the upper arm 21 as shown in FIG. 5. A resilient bushing 32 is positioned within the outer bushing 39. A rigid sleeve 38 is positioned within the resilient bushing 32 as shown in FIG. 5 of the drawings. A support pin 36 projects through the rigid sleeve 38, through the upper arm 21, through the rigid bushing 30 then through the lower arm 23 as shown in FIG. 5 of the drawings. The support pin 36 is retained by an unnumbered key projecting through an unnumbered collar secured to the outer member 42a. The inner arm 40 is pivotally positioned between the upper arm 21 and the lower arm 23 along a horizontal plane. As best shown in FIG. 4, the hydraulic cylinder 28 extends between the side member 26 and the inner arm 40 for allowing a user to hydraulically manipulate the position of the inner arm 40 with respect to the implement frame 12.

As shown in FIGS. 1 through 6, the inner arm 40 preferably has a square ring shaped cross-section. The floor of the lumen includes a ramp portion 46 opposite of the mounting bracket 20 as shown in FIGS. 2 and 3 of the drawings. The ramp portion 46 receives the outer arm 50 when fully extended thereby allowing the outer arm 50 to angle downwardly with respect to the inner arm 40. The outer arm 50 has a corresponding cross-section and is slidably positioned within the lumen of the inner arm 40. Preferably, a pair of wear plates 48 comprised of nylon or similar material are removably attached to the opposing sides of the outer arm 50 for reducing wear, friction and noise. When the wear plates 48 should become worn they are simply removed and replace with new wear plates 48.

As best shown in FIG. 1 of the drawings, the outer arm 50 comprises a first arm 54 and a second arm 56. The second arm 56 is slidably retained within the first arm 54 by an adjustment fastener 58 as shown in FIG. 1. The marking disc 52 is rotatably attached to the distal end of the second arm 56 to mark the ground surface.

As shown in FIGS. 2 and 3, two pairs of lower rollers 53 are rotatably attached to a corresponding set of support brackets 51. The support brackets 51 are attached to a lower portion of the first arm 54. The lower rollers 53 engage the floor within the inner arm 40 thereby allowing the outer arm 50 to extend and retract freely from within the inner arm 40. An upper roller 55 is rotatably attached to the first arm 54 as shown in FIGS. 2 and 3 of the drawings. The upper roller 55 engages the ceiling within the inner arm 40 thereby allowing the outer arm 50 to extend and retract freely from within the inner arm 40. The upper roller 55 further allows the outer arm 50 to freely pivot when fully extended by reducing the amount of friction between the outer arm 50 and the ceiling as best shown in FIG. 3 of the drawings. The threaded shaft 75 is stored between the lower rollers 53 and beneath the outer arm 50 when in the storage position as best shown in FIG. 2 of the drawings. Alternatively, the threaded shaft 75 could removably project within a lumen portion of the outer arm 50.

As shown in FIGS. 2 and 3, a hydraulic motor 70 is positioned within an outer encasement 71. Any other type of motor may be utilized in place of the hydraulic motor 70. The outer encasement 71 is removably positioned within a proximal end of the lumen of the inner arm 40 as shown in FIGS. 2 and 3. The hydraulic motor 70 has a drive shaft 74 which extends outwardly from the hydraulic motor 70. The drive shaft 74 engages a coupler 76 as best shown in FIG. 2. Preferably, the drive shaft 74 is free to slide along a longitudinal axis within the coupler 76. A wear bearing 79 is positioned within a passage 78 of the outer encasement 71. The wear bearing 79 supports the coupler 76 and absorbs most of the longitudinal forces from the threaded shaft 75 as best shown in FIG. 2 of the drawings. The first end of the threaded shaft 75 is attached to the coupler 76 opposite of the drive shaft 74 as shown in FIGS. 2 and 3 of the drawings.

As best shown in FIG. 4 of the drawings, a first line 14 is fluidly connected to a first end of the hydraulic cylinder 28. The first line 14 is also fluidly connected to a hydraulic system of a vehicle such as a tractor. A second line 16 is fluidly connected between a second end of the hydraulic cylinder 28 and the hydraulic motor 70. A third line 18 is fluidly connected to the hydraulic motor 70 and is fluidly connected to the hydraulic system of the tractor. The first line 14 and the third line 18 act as supply and return lines for the telescoping field marker 10. The hydraulic cylinder 28 preferably includes a pair of rephasing orifices to allow the hydraulic motor 70 to completely extend or retract the outer arm 50. It is not important whether the outer arm 50 is completely extended prior to or after the inner arm 40 has been fully extended.

In an alternative embodiment, the first line 14 is fluidly connected to the first end of the hydraulic cylinder 28. The first line 14 is also fluidly connected to a hydraulic system of a vehicle such as a tractor. An unnumbered flow divider within the first line 14 diverts a portion of the hydraulic fluid to the hydraulic motor 70 through an unnumbered diversion line. An unnumbered adjustable valve is within the unnumbered diversion line to allow manual adjustment of the fluid flow through the unnumbered diversion line. The second line 16 is fluidly connected between a second end of the hydraulic cylinder 28 and the hydraulic system. The third line 18 is fluidly connected to the hydraulic motor 70 and is fluidly connected to the hydraulic system of the tractor. This embodiment allows increased control over the flow into the hydraulic motor 70 to ensure proper extension and retraction in relation to the inner arm 40.

The threaded shaft 75 has a first end and second end, wherein the first end is attached to the hydraulic motor 70 as shown in FIGS. 2 and 3 of the drawings. A stopper 77 is attached to the second end of the threaded shaft 75. As shown in FIGS. 2 and 3, the threaded shaft 75 is in threaded engagement with a balled nut 60 which is attached to the outer arm 50 by an elongated member 66 for extending and retracting the outer arm 50 depending upon the direction of rotation by the hydraulic motor 70. The balled nut 60 has a plurality of ball bearings 64 within which engage the threaded portion of the threaded shaft 75. The balled nut 60 reduces the heat generated by a conventional nut when subjected to high rotational speeds. Because of the reduced friction from the balled nut 60 compared to convention nuts, less hydraulic pressure is required to rotate the threaded shaft 75. The elongated member 66 may be pivotally attached between the outer arm 50 and the balled nut 60 to allow for vertical movement of the outer arm 50. The stopper 77 prevents the balled nut 60 from becoming removed from the threaded shaft 75 and limits the extension length of the outer arm 50. Preferably, the threaded shaft 75 has approximately a one inch lead for allowing a quick extension and retraction of the outer arm 50. The one inch lead also reduces the chances that the balled nut 60 will become locked with respect to the stopper 77 when the outer arm 50 is fully extended.

Figure 6:
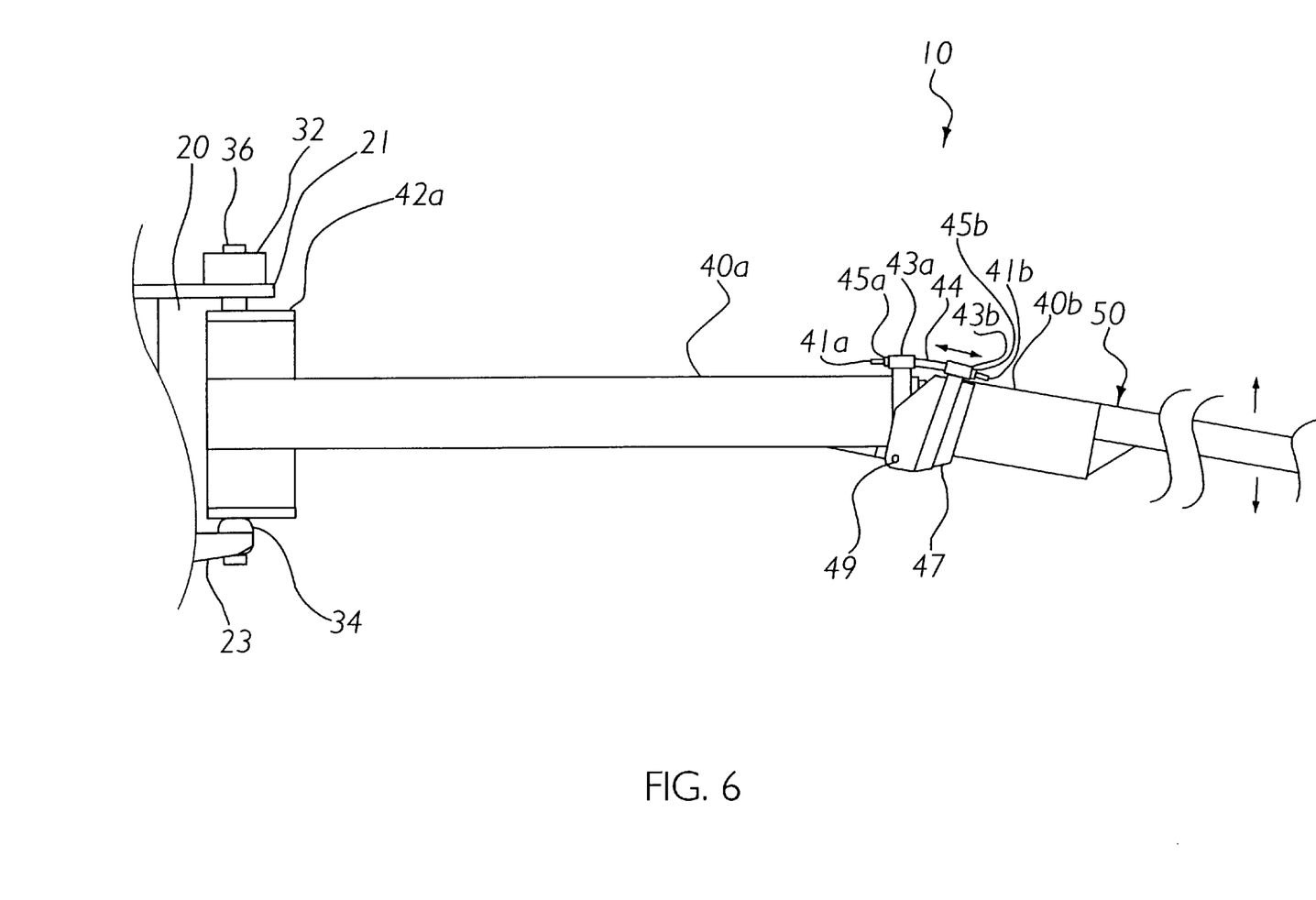
FIG. 6 is a front view of a second embodiment of the present invention disclosing a bracket pivotally attached to the inner arm.

In an alternative embodiment as shown in FIG. 6 of the drawings, a bracket 47 is pivotally attached to the distal end of the inner arm 40a by a pin 49. A slide bushing 43a is attached to an upper surface of the inner arm 40a. Another slide bushing 43b is attached to the inner arm 40b as shown in FIG. 6. A corresponding pair of threaded rods 41a–b are slidably positioned within the pair of slide bushings 43a–b. A cable 44 is attached between the pair of threaded rods 41a–b as shown in FIG. 6. A corresponding pair of nuts 45a–b are attached to the corresponding pair of threaded rods 41a–b to allow adjustment of the angle of the inner arm 40b. In operation, the inner arm 40b and the outer arm 50 are free to pivot upwardly and downwardly to compensate for rough terrain by the slide bushing 43 sliding upon the cable 44.

In use, a pair of telescoping field markers 10 are attached to opposing sides of the implement frame 12. When the user desires to place a mark into the ground surface on one side of the implement frame 12, they manipulate a hydraulic control lever within the tractor which provides hydraulic pressure to the hydraulic cylinder 28. As the hydraulic cylinder 28 and the inner arm 40 are being extended, the exhaust hydraulic fluid from the hydraulic cylinder 28 enters the hydraulic motor 70. The hydraulic motor 70 then rotates so as to manipulate the outer arm 50 outwardly from the inner arm 40. This continues until both the hydraulic cylinder 28 and the outer arm 50 are fully extended. When the outer arm 50 is fully extended, the lower rollers 53 are in engagement with the ramp portion 46 of the inner arm 40. The outer arm 50 is thereafter free to pivot upwardly to compensate for rough terrain since the upper roller 55 acts as a pivot point as best shown in FIG. 3 of the drawings. The marking disc 52 is free to penetrate the ground surface thereby leaving a visible mark for the user to follow. When the user desires to retract the telescoping field marker 10 into the storage position, the above process is simply reversed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A telescoping field marker which is compact when retracted, comprising:
   a bracket structure which is attachable to an implement frame;
   an inner arm having a lumen, wherein said inner arm is movably attached to said bracket structure;
   a hydraulic cylinder attached to said bracket structure and to said inner arm;
   said lumen includes a ceiling and a floor;
   an outer arm having a proximal end and a distal end, wherein said outer arm is slidably positioned within said lumen of said inner arm;
   an extending/retracting means attached within said inner arm and to said proximal end of said outer arm for extending and retracting said outer arm with respect to said inner arm; and
   a marking means attached to said distal end of said outer arm wherein said extending/retracting means comprises: a motor means adjacent said bracket structure; and a threaded shaft having a first end and second end, wherein said first end is attached to said motor means and wherein said threaded shaft is in threaded engagement with said outer arm for extending and retracting said outer arm depending upon a direction of rotation by said motor means.

2. The telescoping field marker of claim 1, wherein said floor of said lumen includes a ramp portion opposite of said bracket structure, wherein said ramp portion receives said outer arm when fully extended thereby allowing said outer arm to angle downwardly with respect to said inner arm.

3. The telescoping field marker of claim 1, wherein said threaded shaft has at least a 0.3 inch lead to allow a relatively quick extension and retraction of said outer arm.

4. The telescoping field marker of claim 3, including a balled nut attached to said outer arm near said proximal end, wherein said balled nut is threadably connected about said threaded shaft.

5. The telescoping field marker of claim 4, wherein said second end of said threaded shaft includes a stopper for preventing said outer arm from overextending.

6. The telescoping field marker of claim 1, including at least one wear plate attached to an outer surface of said outer arm.

7. The telescoping field marker of claim 1, wherein said outer member includes at least two lower rollers rotatably attached to a lower portion of said outer member for rotatably engaging said floor of said lumen.

8. The telescoping field marker of claim 7, wherein said outer member further includes at least one upper roller rotatably attached to an upper portion of said outer member for rotatably engaging said ceiling of said lumen.

9. The telescoping field marker of claim 1, wherein said motor means comprises a hydraulic motor.

10. The telescoping field marker of claim 9, including:
    a first line fluidly connected to a first end of said hydraulic cylinder and fluidly connectable to a hydraulic system of a vehicle;
    a second line fluidly connected between a second end of said hydraulic cylinder and said hydraulic motor; and
    a third line fluidly connected to said hydraulic motor and fluidly connectable to said hydraulic system of said vehicle.

11. The telescoping field marker of claim 10, wherein said hydraulic cylinder includes at least one rephasing orifice for allowing said hydraulic cylinder to fully extend and retract.

12. The telescoping field marker of claim 1, wherein a tube is pivotally attached to an outer end of said inner arm, wherein said tube receives said outer arm when fully extended thereby allowing said outer arm to angle downwardly with respect to said inner arm.

13. A The telescoping field marker of claim 12, including:
    a first bushing attached to said outer end of said inner arm;
    a second bushing attached to said tube;
    a pair of nuts threadably attached to said first threaded rod and to said second threaded rod;
    a first threaded rod slidably extending within said first bushing;
    a second threaded rod slidably extending within second bushing,
    a flexible cable attached between said first threaded rod and said second threaded rod which slidably receives said second bushing when said tube is pivoted with respect to said inner arm.

14. The telescoping field marker of claim 13, wherein said extending/retracting means comprises:

a hydraulic motor adjacent said bracket structure; and a threaded shaft having a first end and second end, wherein said first end is attached to said motor means and wherein said threaded shaft is in threaded engagement with said outer arm for extending and retracting said outer arm depending upon a direction of rotation by said motor means.

15. The telescoping field marker of claim 14, wherein said threaded shaft has at least a 0.3 inch lead to allow a relatively quick extension and retraction of said outer arm.

16. The telescoping field marker of claim 15, including a balled nut attached to said outer arm near said proximal end, wherein said balled nut is threadably connected about said threaded shaft.

17. The telescoping field marker of claim 16, including at least one wear plate attached to an outer surface of said outer arm.

18. The telescoping field marker of claim 17, wherein said outer member includes:

at least two lower rollers rotatably attached to a lower portion of said outer member for rotatably engaging said floor of said lumen; and at least one upper roller rotatably attached to an upper portion of said outer member for rotatably engaging said ceiling of said lumen.

19. The telescoping field marker of claim 18, including:

a first line fluidly connected to a first end of said hydraulic cylinder and fluidly connectable to a hydraulic system of a vehicle;

a second line fluidly connected between a second end of said hydraulic cylinder and said hydraulic motor;

a third line fluidly connected to said hydraulic motor and fluidly connectable to said hydraulic system of said vehicle; and wherein said hydraulic cylinder includes at least one rephasing orifice for allowing said hydraulic cylinder to fully extend and retract.

\* \* \* \* \*